(12) United States Patent
Tiemann et al.

(10) Patent No.: US 6,550,496 B2
(45) Date of Patent: Apr. 22, 2003

(54) ROTARY DOSER VALVE

(75) Inventors: Jerome Johnson Tiemann, Schenectady, NY (US); Andrew Philip Shapiro, Schenectady, NY (US); Walter Whipple, III, Amsterdam, NY (US); Richard DeVos, Goshen, KY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/759,504

(22) Filed: Jan. 16, 2001

(65) Prior Publication Data

US 2002/0092869 A1 Jul. 18, 2002

(51) Int. Cl.$^7$ .............................................. F16K 11/074
(52) U.S. Cl. ................... 137/625.46; 222/249
(58) Field of Search ....................... 137/625.43, 625.46; 222/249, 389

(56) References Cited

U.S. PATENT DOCUMENTS

| ,016,284 | A | * | 12/1856 | Mason ........................ 222/249 |
| ,235,573 | A | * | 12/1880 | Sack .......................... 222/249 |
| 2,427,429 | A | * | 9/1947 | Waite et al. ................. 222/249 |
| 3,411,525 | A | * | 11/1968 | Auger .................... 137/625.43 |
| 3,565,287 | A | * | 2/1971 | Johnston ..................... 222/249 |
| 3,892,259 | A | * | 7/1975 | McClocklin ........... 137/625.21 |
| 4,073,159 | A | * | 2/1978 | Trippi ........................ 62/340 |
| 4,207,994 | A | * | 6/1980 | Offlee Sr. ................ 222/146.1 |
| 4,371,003 | A | * | 2/1983 | Goguen ................. 137/625.46 |
| 5,690,144 | A | * | 11/1997 | Takahashi .............. 137/625.43 |
| 5,787,929 | A | * | 8/1998 | Iwata ..................... 137/625.43 |
| 6,161,390 | A | | 12/2000 | Kim |
| 6,220,038 | B1 | | 4/2001 | Marsh et al. |
| 6,222,031 | B1 | | 4/2001 | Wakabayashi et al. |
| 6,241,967 | B1 | | 6/2001 | Sachse et al. |

* cited by examiner

Primary Examiner—John Fox
(74) Attorney, Agent, or Firm—Penny A. Clarke; Noreen C. Johnson

(57) ABSTRACT

A rotary doser valve includes a stator with a plurality of ports therein which cooperates with a rotor having a plurality of channels therein. The rotor is rotatable against the stator in first and second positions which alternately channel water to and from a doser for refilling an icemaker in a preferred use.

14 Claims, 7 Drawing Sheets

ROTARY DOSER VALVE

CROSS REFERENCE TO RELATED APPLICATION

The present invention is related to the Icemaker Dose Dispenser disclosed in U.S. patent application Ser. No. 09/664,123, filed Sep. 18, 2000, pending.

BACKGROUND OF THE INVENTION

The present invention relates generally to refrigerators, and, more specifically, to water valves therein.

A refrigerator includes a refrigeration compartment in which food is stored below room temperature but above freezing, and a freezer compartment in which frozen food is stored below freezing temperature.

The freezer commonly includes an automatic icemaker which is periodically supplied with water to fill an icetray therein for forming ice cubes. And, it is common to also include an accessible dispenser in the freezer door for dispensing ice cubes on demand, as well as dispensing cold water.

The refrigerator is connected to a common water supply tube and requires a suitable valve for periodically refilling the icetray, and a second valve for dispensing water when desired. The icemaker valve is typically operated using a timer to suitably refill the icetray. However, due to variation in water pressure in the water supply, timed operation of the icemaker valve may result in variation in ice cube size.

In the cross referenced application a specifically configured spool valve is used in combination with a two-compartment doser having a movable septum therein for alternately supplying doses of water to the icemaker.

Accordingly, it is desired to provide an improved doser valve for use in the icemaker.

BRIEF SUMMARY OF THE INVENTION

A rotary doser valve includes a stator with a plurality of ports therein which stator cooperates with a rotor having a plurality of channels therein. The rotor is rotatable against the stator in first and second positions which alternately channel water to and from a doser for refilling an icemaker.

DETAILED DESCRIPTION OF THE INVENTION

Figure 1:
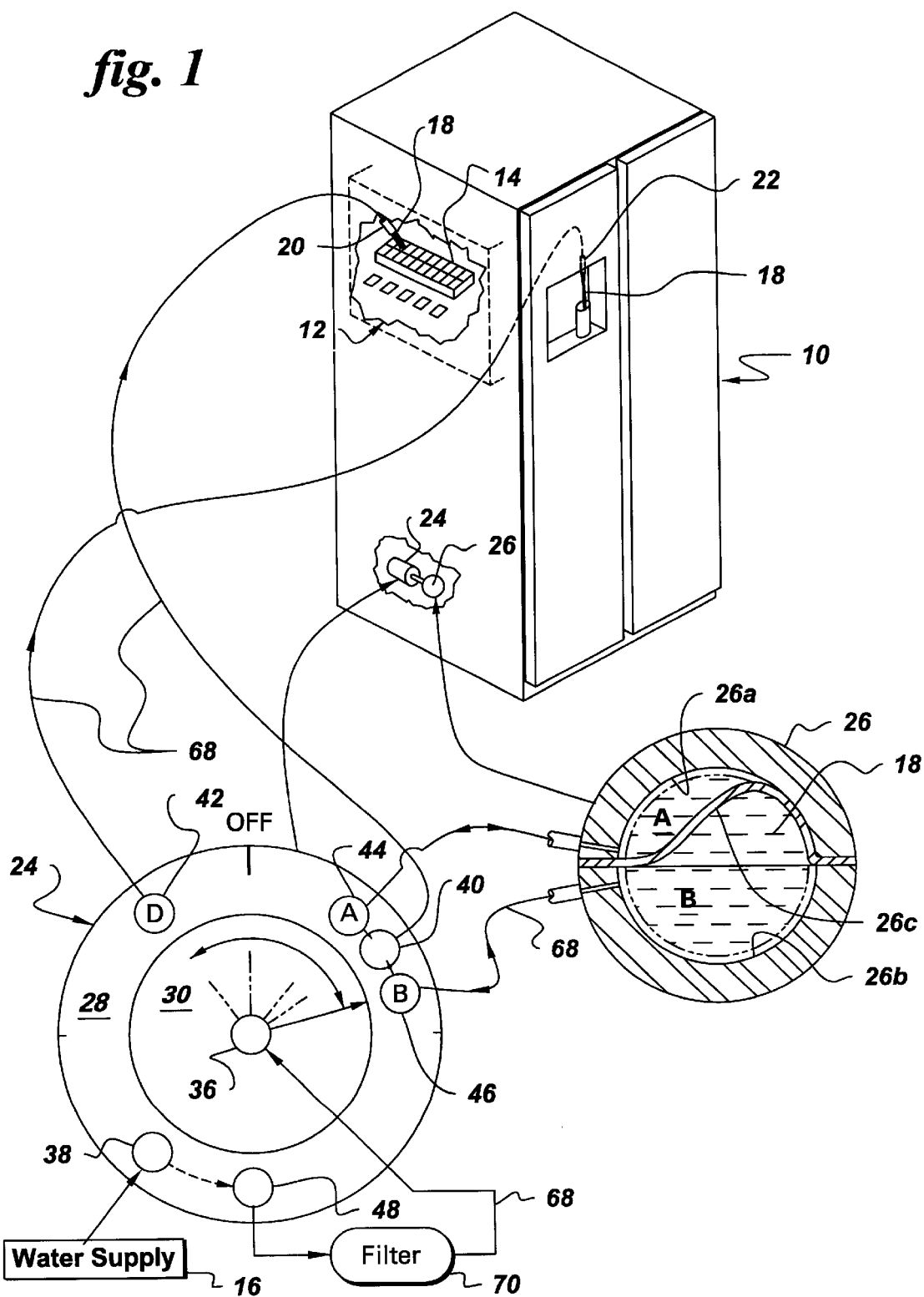
FIG. 1 is a schematic representation of an exemplary refrigerator having an icemaker provided with water from a rotary doser valve in accordance with an exemplary embodiment of the present invention.

Illustrated in FIG. 1 is a refrigerator 10 which may have any conventional configuration. A side-by-side model is illustrated with a refrigerator compartment and door on the right side, and a freezer compartment and door on the left side. The refrigerator includes a conventional refrigeration system therein which maintains food placed in the refrigerator compartment below room temperature but above freezing temperature, while maintaining frozen food placed in the freezer compartment at temperature below freezing.

Disposed inside the freezer compartment is an icemaker 12 which may have any conventional configuration including an icetray 14 having multiple compartments therein in which water may be frozen into corresponding ice cubes.

The refrigerator is joined to any suitable water supply 16, such as a water inlet pipe or tube, for channeling water 18 to a first nozzle 20 in the icemaker for filling the icetray, and to a second nozzle or dispenser 22 in an access compartment in the freezer door for selectively receiving water when desired.

In accordance with the present invention, a rotary doser valve 24 is suitably mounted inside the refrigerator and is configured for both channeling water to the icemaker 12 as well as to the water dispenser 22 when required. In the preferred embodiment illustrated in FIG. 1, the rotary valve 24 is specifically configured for cooperating with an integral doser 26 which accurately controls the individual doses of water supplied to the icemaker for accurately filling the icetray 14 irrespective of the water pressure supplied to the refrigerator.

The doser 26 is a metering device having first and second chambers 26a,b separated by a movable septum 26c, in the exemplary form of a flexible diaphragm suitably mounted in the two half-cases of the doser. Each chamber has a corresponding access port which permits the water to be channeled alternately in and out therethrough.

In operation, water is delivered through the first access port into the first chamber 26a which displaces the septum 26c against the inner surface of the second chamber 26b to completely fill both chambers with water. Then in an alternating cycle, water is delivered through the second access port into the second chamber which displaces the septum into the first chamber and discharges the water on the opposite side of the septum through the corresponding first access port.

The individual water doses A and B represent one full volume each of the doser and are alternately delivered to the icetray 14 for accurately filling the compartments therein in any suitable number of cycles of the reciprocating septum 26c. In this way, the number of cycles of water doses metered by the doser 26 accurately determines the amount of water delivered to the icetray 14 irrespective of the operating pressure of the water supplied to the refrigerator.

Figure 2:
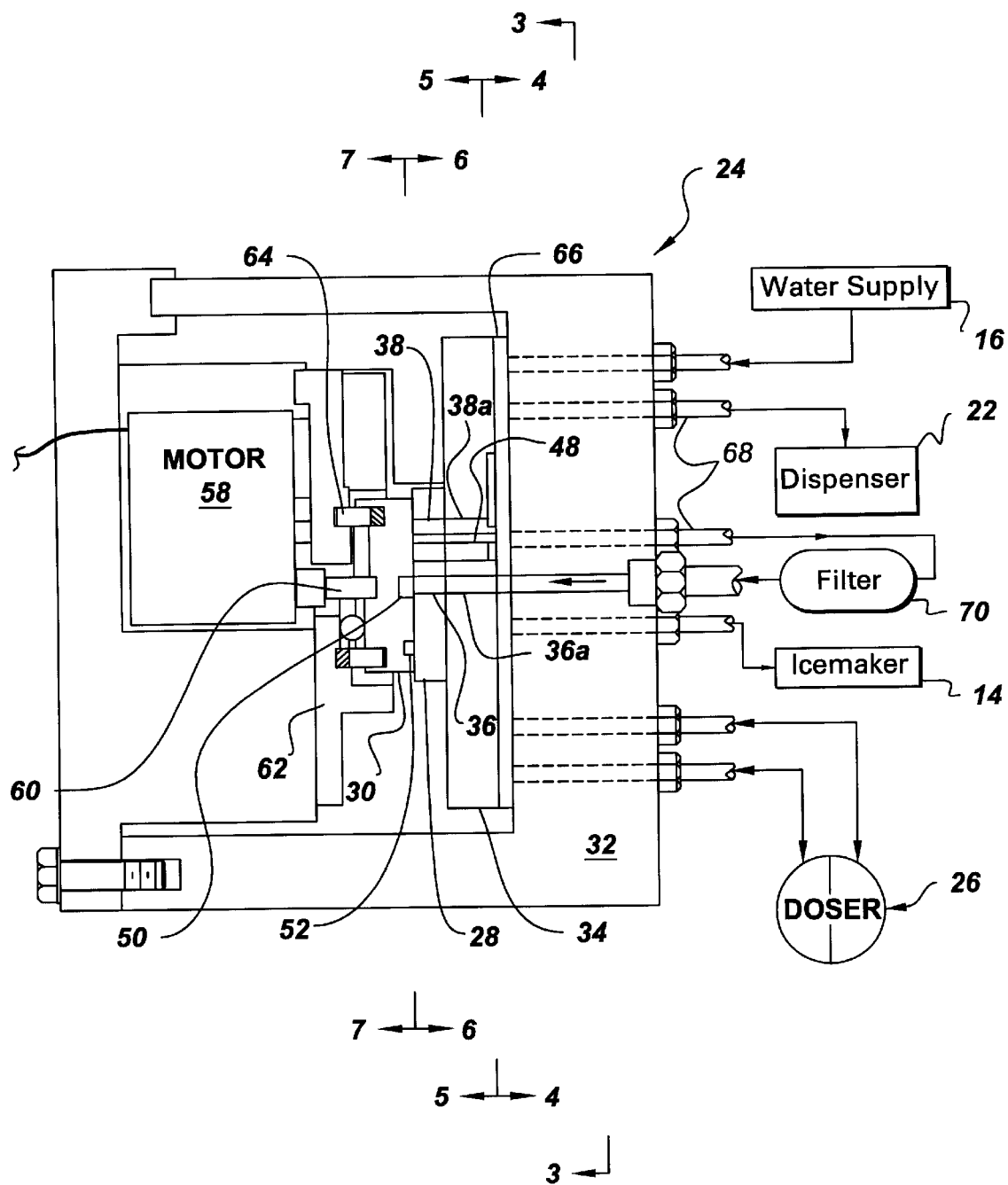
FIG. 2 is a partly sectional axial view of the rotary doser valve illustrated in FIG. 1 in accordance with an exemplary embodiment.

The rotary valve 24 is illustrated schematically in FIG. 1, and in a an another embodiment in FIG. 2 that includes a stationary valve stator 28 cooperating with a rotary valve rotor 30 for alternately supplying water to the two chambers of the doser 26 and correspondingly directing the discharge water therefrom to the icemaker. The stator 28 is suitably fixedly mounted in a housing 32 of the valve which includes a removable cover for permitting assembly of the various components of the valve therein.

In the preferred embodiment illustrated in FIG. 2, both the stator 28 and rotor 30 are in the form of relatively small disks having smooth, flat mating surfaces coaxially abutting each other to form a fluid-sealed fit therebetween. A distributor 34 in the form of a larger disk has a smooth flat front surface mating with a correspondingly smooth flat mating back surface of the stator 28 in coaxial abutment therewith for forming another fluid-sealed fit therewith.

In this way, the rotor 30 is disposed on the front side of the stator 28, and the distributor 34 is disposed on the back side of the stator and provides a larger area for connecting the valve to the various flow circuits in the refrigerator as described in further detail hereinbelow.

Figure 3:
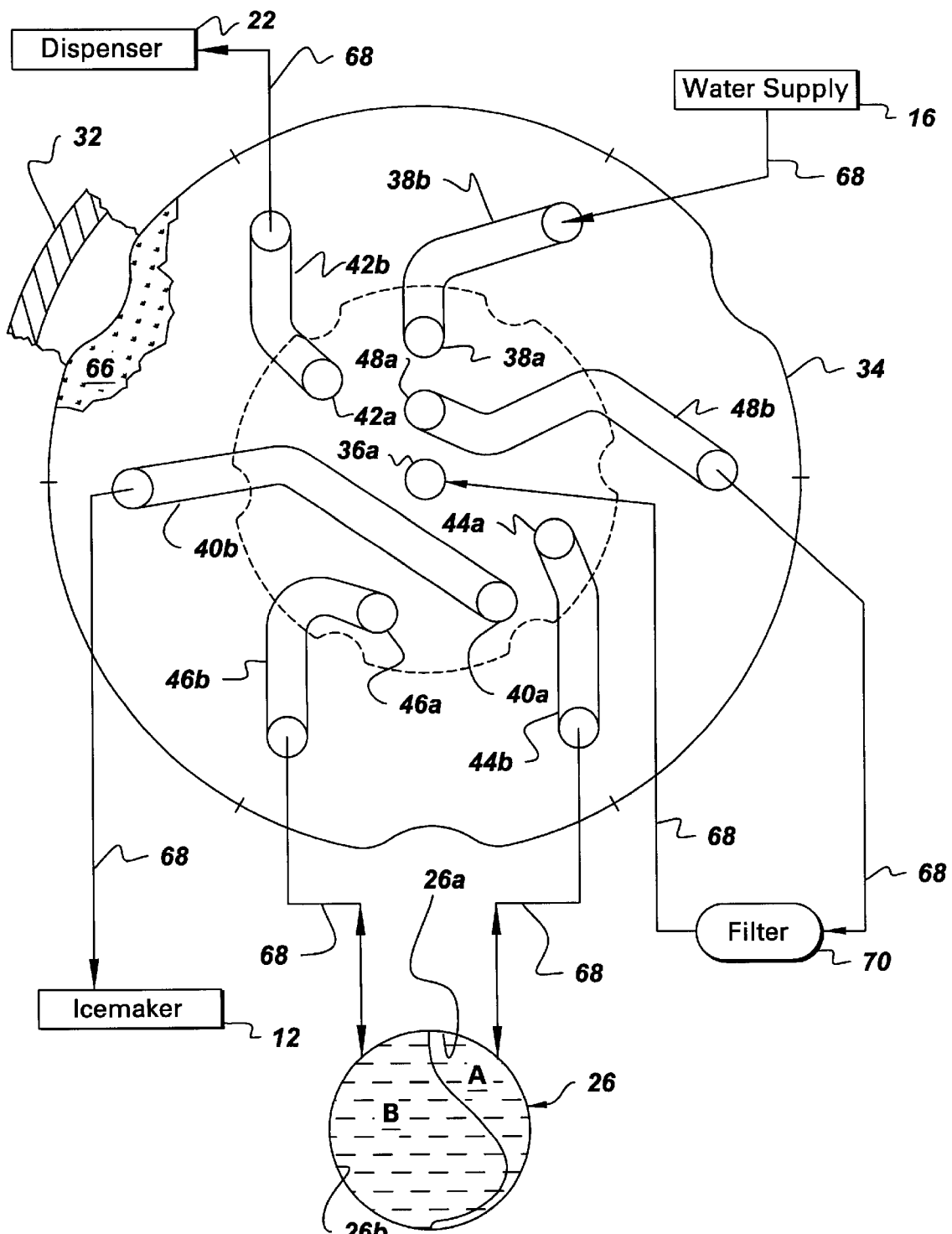
FIG. 3 is a plan view of the back end of a distributor disk mounted in the housing illustrated in FIG. 2 and taken along line 3—3.
Figure 4:
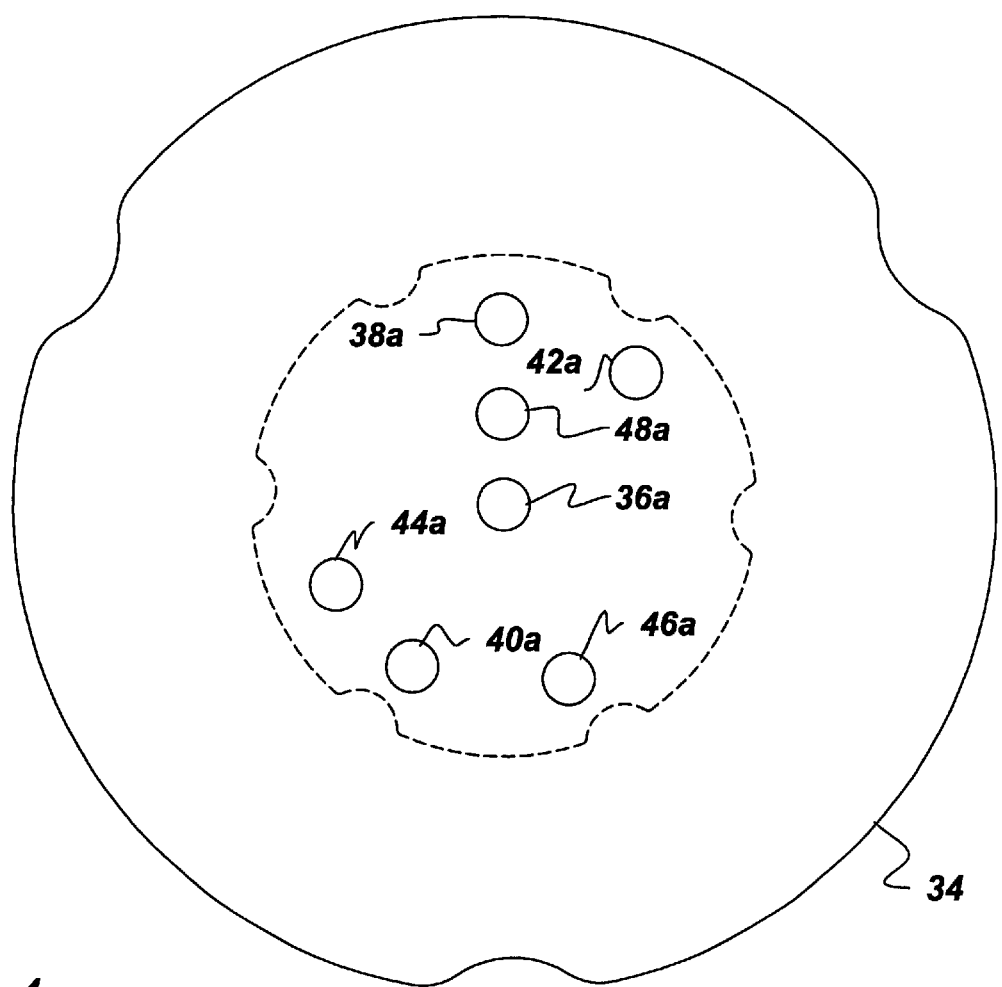
FIG. 4 is a plan view of the front side of the distributor disk illustrated in FIG. 2 and taken along line 4—4.
Figure 5:
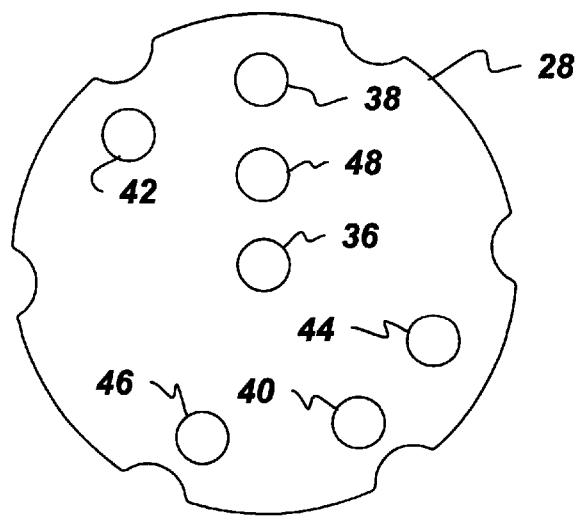
FIG. 5 is a plan view of the back side of a valve stator illustrated in FIG. 2 and taken along line 5—5.
Figure 6:
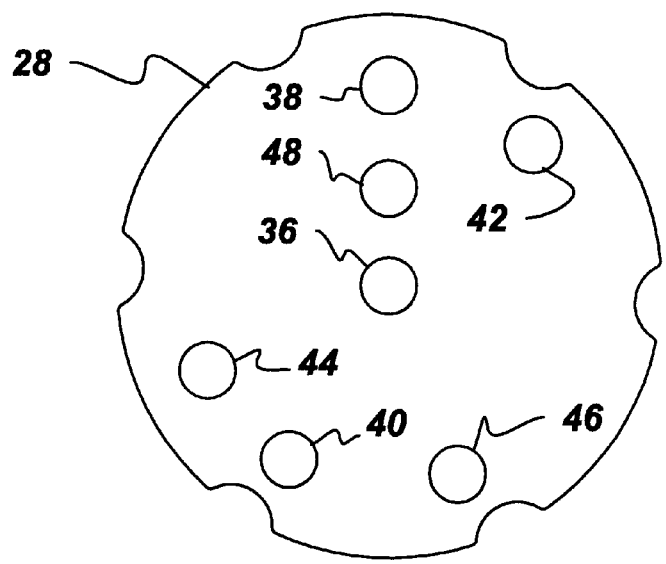
FIG. 6 is a plan view of the front side of the valve stator illustrated in FIG. 2 and taken along line 6—6.
Figure 7:
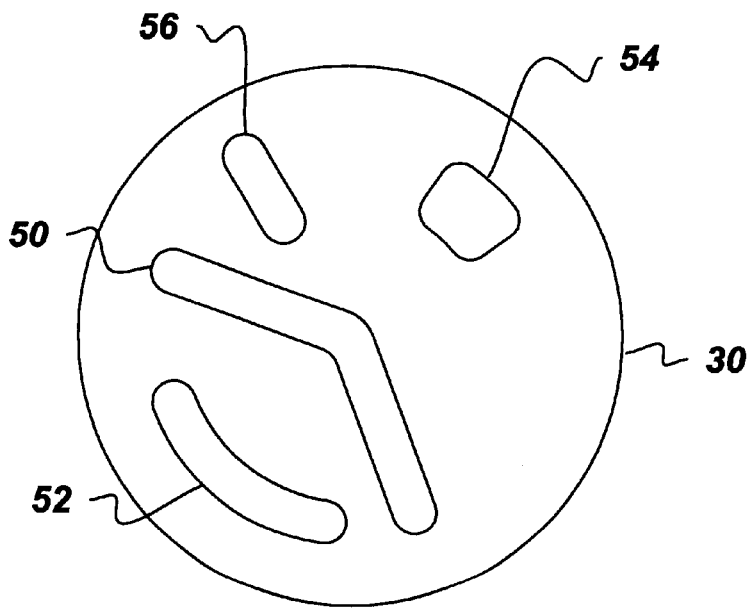
FIG. 7 is plan view of the back side of a valve rotor illustrated in FIG. 2 and taken along line 7—7.

The back and front sides of the distributor 34 are illustrated in FIGS. 3 and 4. The back and front sides of the stator 28 are illustrated in FIGS. 5 and 6. And, the back side of the rotor 30 is illustrated in FIG. 7, all in an embodiment specifically configured for the disk form of the rotor and stator. In alternate embodiments, the rotor and stator may be cylindrical or conical in a manner analogous with the disk form thereof for selectively channeling the water through various flow circuits defined therebetween.

More specifically, the stator 28 illustrated in FIGS. 5 and 6 includes first and second inlet ports 36,38; first and second outlet ports 40,42; first and second doser ports 44,46; and a bypass port 48 extending axially through the disk stator and spaced laterally or radially apart from each other in the preferred embodiment.

As shown in FIG. 7, the rotor 30 includes a switching channel 50, a bridging channel 52, a diversion channel 54, and a linking channel 56 in the form of grooves or troughs formed in the flat back surface of the disk rotor and suitably spaced apart from each other. The four channels 50–56 cooperate with the seven ports 36–48 to control the path of water through the valve depending upon the specific rotary position of the rotor relative to the stator.

As shown in FIG. 2, means in the preferred form of a stepper motor 58 are suitably mounted inside the housing for selectively rotating the rotor to various rotary positions thereof relative to the stationary stator 28. The motor 58 includes a driven rotary spindle 60 suitably joined to the center of the front side of rotor 30 for rotation thereof. For example, the spindle 60 may have a square or rectangular end mounted in a complementary square or rectangular socket formed in the center of the front side of the rotor.

A plastic shim or bridge 62, is typically plastic is mounted between the motor 58 and the front side of the rotor 30 and between which is positioned a compression spring 64, typically an annular wave type.

The various components of the valve illustrated in FIG. 2 may be assembled in turn inside the housing 32, axially stacked together, and then retained therein by mounting the cover of the housing thereto. The compression spring 64 provides a compression force for pressing the rotor 30 in sealing abutment against the stator 28 for maintaining a tight sealing fit therebetween.

In another embodiment, both the rotor 30 and stator 28 are formed of a suitable ceramic material having smooth, flat, abutting mating surfaces forming an effective water seal between the rotor and stator irrespective of the relative rotary position therebetween.

Illustrated in FIGS. 8–11 are four positions of the rotor 30, shown in part in phantom, relative to the stator 28 upon which it is seated.

The four rotor positions correspond with alternately filling each of the two doser chambers illustrated in FIG. 1 for supplying the icemaker with water; or supplying water to the dispenser 22; or in an off position blocking all water flow through the valve.

The distributor 34 illustrated in FIGS. 2 and 3 is provided to cooperate with the relatively small valve rotor and stator for conveniently distributing the water to the various components in corresponding water circuits. As shown in FIG. 3, the distributor 34 includes a plurality of distributor ports identified by the suffix (a) disposed in flow communication with respective ones of the stator ports 36–48 in a one-to-one correspondence therewith.

The seven distributor ports 36a–48a have an identical pattern to those of the stator ports and are respectively aligned therewith. The distributor also includes a plurality of distributor channels designated by the suffix (b) formed as grooves or troughs in the back side of the distributor which extend radially outwardly where space permits from respective ones of the distributor ports 38a–48a. The inlet port 36a of the distributor is centrally located and does not use the corresponding distributor channel, although in an alternate embodiment such a channel may be used therefor.

A flat rubber gasket 66 as shown in FIG. 2 is disposed between the back side of the distributor in which the channels are formed and a corresponding flat surface of the housing 24 to seal the distributor ports and channels against water leakage. A plurality of conduits or tubes 68 are joined to the housing with suitable fluid tight fittings in flow communication with respective ones of the distributor ports 38a–48a through corresponding portions of the gasket, and preferably at the radially outer ends of the corresponding distributor channels. In this way, the corresponding stator ports 36–48 are connected in corresponding water circuits to the icemaker 14, water supply 16, dispenser 22, doser 26, and an optional water filter 70.

The rotary valve illustrated in FIG. 2 is preferably configured with all seven stator and distributor ports for effecting various interrelated water circuits to the doser 26, icemaker 12, and dispenser 22 in a multi-function rotary valve. However, all these functions need not be introduced into the same valve but may be separated therefrom in alternate embodiments.

Figure 10:
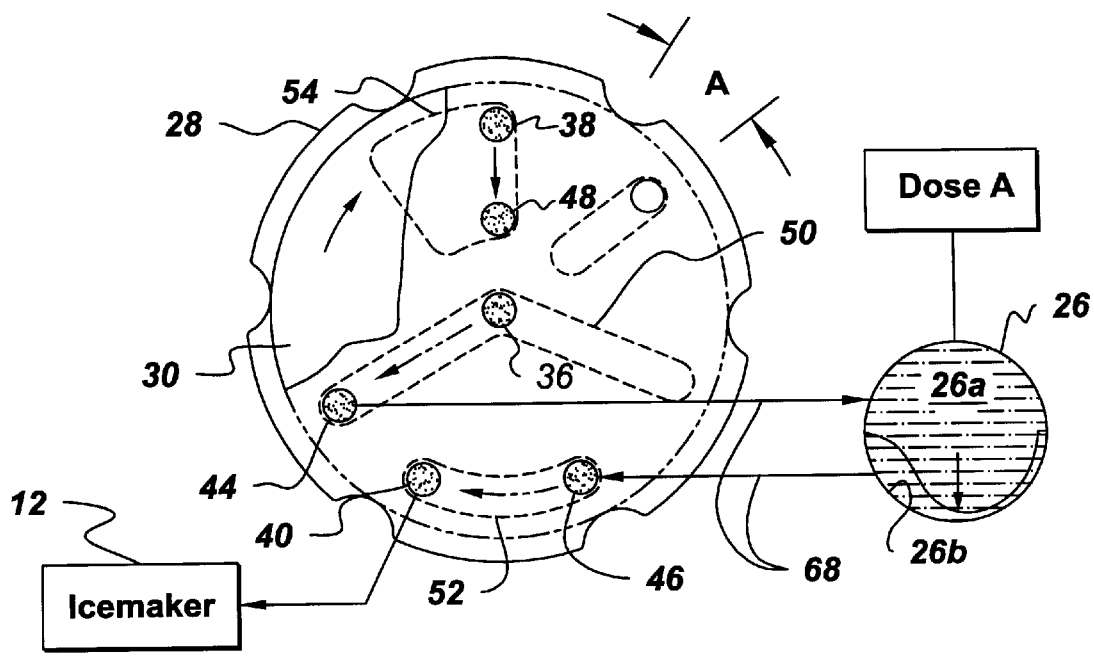
FIG. 10 is a plan view, like FIG. 8, with the rotor repositioned for aligning the channels and ports to direct water to one side of the doser while returning water from the opposite side thereof.

The fundamental or basic operation and configuration of the rotary valve 24 illustrated in FIG. 1 is to alternately supply water to the two chambers of the doser 26 and delivering the water discharged therefrom by the moving septum to the icemaker. FIG. 10 illustrates a first rotor position A corresponding with supplying water to the doser first chamber 26a for providing a corresponding dose of water pumped by the septum back through the valve to the icemaker 12. In the first rotor position, the switching channel 50 is joined in flow communication between the first inlet port 36 and the first doser port 44, while simultaneously the bridging channel 52 is joined in flow communication between the second doser port 46 and the first outlet port 40.

Although water could be directly supplied from the water supply to the first inlet 36, the filter 70 is preferably connected with the rotary valve for providing filtered water to the first inlet port 36 while isolating the filter when the valve is off. As shown in FIGS. 2 and 3, the second inlet port 38 is introduced in the stator for direct connection to the water supply 16 through the corresponding circuit in the distributor for first receiving the water therefrom, and cooperates with the bypass port 48 which channels the inlet water through the distributor to the external filter 70 connected thereto which returns filtered water to the first inlet port 36 for use in the icemaker and dispenser.

When the valve is off, water flow to the filter is interrupted. When the valve is in the dispense or doser positions, water freely flows through the filter to the dispenser or doser and icemaker. In either case, the filter is not subject to full line pressure of the water and may have a low-pressure filter housing to reduce cost.

The diversion channel 54 illustrated in FIGS. 7 and 10 is correspondingly introduced into the rotor 30 for cooperating with the second inlet port 38 and bypass port 48. The diversion channel 54 is suitably laterally spaced from the switching channel 50 and is disposed in flow communication between the second inlet port 38 and the bypass port 48 in the first rotor position A illustrated in FIG. 10, as well as in the second rotor position B illustrated in FIG. 11.

In the second rotor position B, the rotor 30 is rotated to join the switching channel 50 in flow communication between the first inlet port 36 and the second doser port 46, while simultaneously joining the bridging channel 52 in flow communication between the first doser port 44 and the first outlet port 40. In this way, the filtered water supplied to the first inlet port 36 is channeled either to the doser first chamber 26a or the second chamber 26b, while the correspondingly opposite doser chamber is joined in a flow circuit to the icemaker 12 for discharging each dose of water from the doser 26. The stepper motor provides accurate rotary position of the rotor and may be used for oscillating or reciprocating the rotor 30 back and forth between the two adjacent rotor positions A, B to accurately fill the icetray with water from the doser with one or more cycles thereof as desired.

Figure 8:
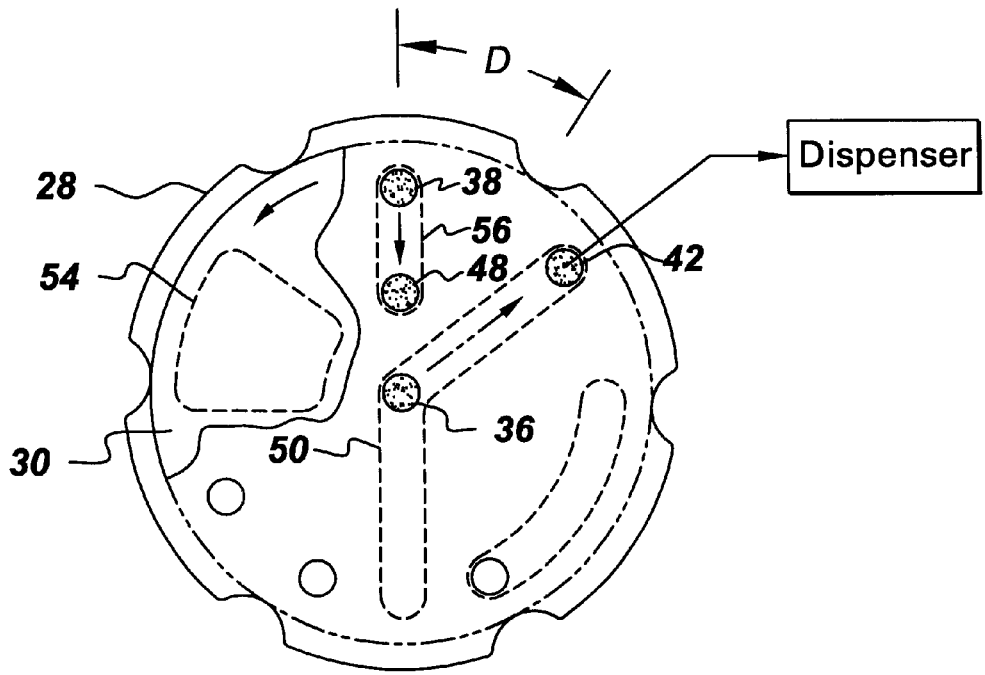
FIG. 8 is a superimposed plan view of the valve rotor of FIG. 2 disposed in abutting contact atop the valve stator aligning respective channels and ports therein for dispensing water in a corresponding rotor position.

In addition to controlling operation of the doser 26, the rotary valve 24 may be additionally used for controlling operation of the dispenser 22. FIG. 8 illustrates the rotor 30 in a third rotor position D wherein the same switching channel 50 is repositioned to join in flow communication the first inlet port 36 and the second outlet port 42 which in turn are connected through the corresponding tube 68 to the dispenser 22.

Correspondingly, the linking channel 56 is introduced into the rotor and spaced circumferentially between the diversion channel 54 and the switching channel 50 for simultaneously joining in flow communication the second inlet port 38 and the bypass port 48 in the third rotor position. In this way, water is carried through the linking channel 56 to the filter and then back to the switching channel 50 for providing filtered water directly to the dispenser 22.

Figure 9:
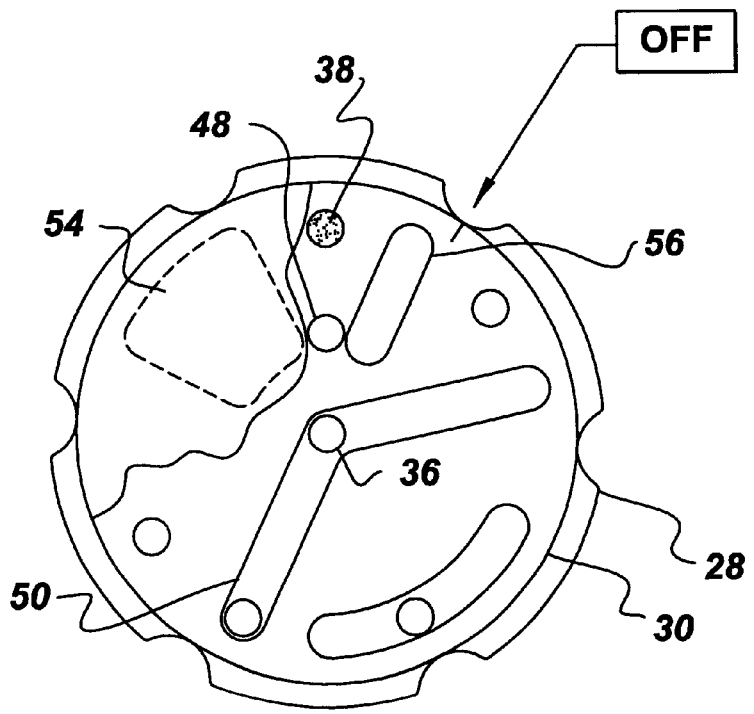
FIG. 9 is a plan view, like FIG. 8, with the rotor repositioned to an off position blocking water flow through the valve.

FIG. 9 illustrates a fourth rotor position which blocks or turns off the water at the second inlet port 38. In the off rotor position, the diversion channel 54 and the linking channel 56 are spaced circumferentially apart from each other, and are circumferentially offset from the second inlet port 38 and bypass port 48 so that the corresponding portion of the flat back surface of the rotor 30 blocks the second inlet port 38 and correspondingly blocks water flow into the bypass port 48.

The multiple flow circuits of the rotary valve are created by the preferred position and orientation of the stator ports illustrated in FIG. 6 and the rotor channels cooperating therewith in a relatively small mating surface area. The first inlet port 36 is typically disposed in the center of the stator disk 28, and provides an axially straight flowpath through the cooperating distributor and valve housing to the corresponding tube joined to the filter. The first and second doser ports 44,46 are spaced radially outwardly from the center inlet port 36 and circumferentially spaced apart from each other at a suitable obtuse angle therebetween.

The first inlet port 38 and bypass port 48 are typically aligned radially in turn with the center inlet port 36.

The first and second doser ports 44,46, and the first and second outlet ports 40,42 are typically circumferentially aligned together at a common radius from the center of the stator. The first outlet port 40 is disposed circumferentially between the first and second doser ports 44,46. The second outlet port 42 is spaced circumferentially from the two doser ports 44,46 and circumferentially between the second doser port 46 and the second inlet port 38. And, the first doser port 44, first outlet port 40, second doser port 46, second outlet port 42, and second inlet port 38 are disposed in turn circumferentially around the stator 28 in the exemplary counterclockwise direction illustrated in FIG. 6.

The rotor 30 illustrated in FIG. 7 is correspondingly configured to cooperate with the pattern of stator ports illustrated in FIG. 6. The switching channel 50 typically has two radial legs extending radially outwardly from a center apex thereof corresponding with the first inlet port 36 of the stator, with the legs being spaced apart at an obtuse angle suitably larger than the obtuse angle between the first and second doser ports 44,46 illustrated in FIG. 6. In this way, the switching channel 50 may be rotated between the two rotor positions A,B illustrated in FIGS. 10 and 11 to join the center inlet 36 with either one, but not both, of the first and second doser ports 44,46.

Figure 11:
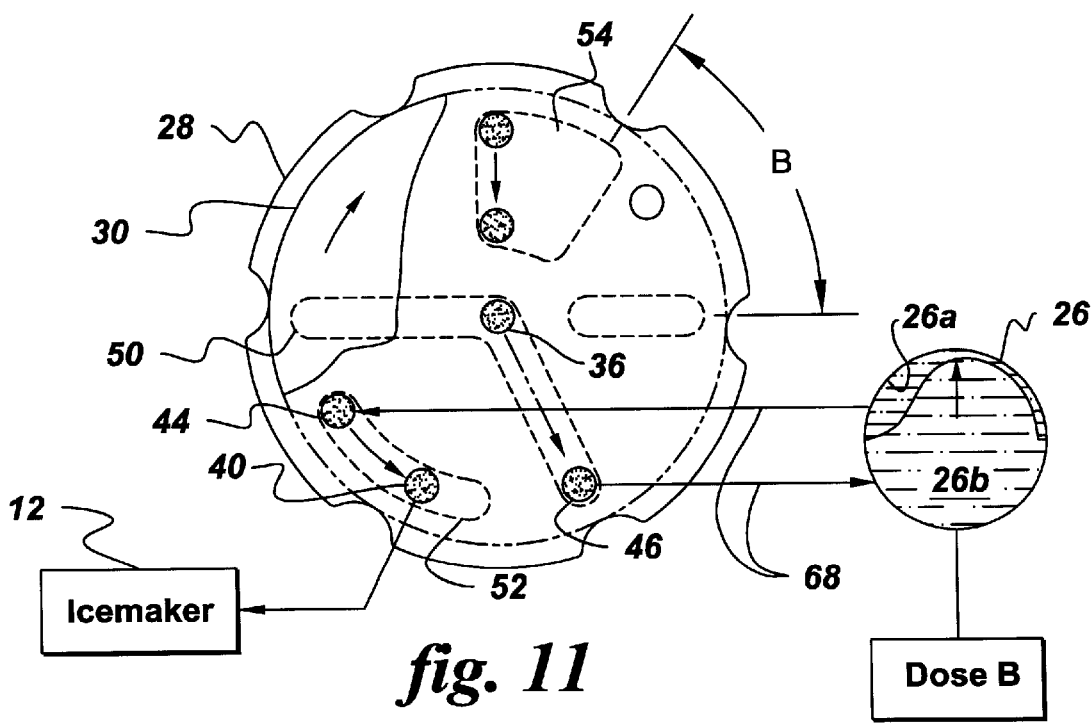
FIG. 11 is a plan view, like FIG. 8, with the rotor repositioned to align the channels and ports for directing water to the second side of the doser while returning water from the opposite first side thereof.

The bridging channel 52 illustrated in FIG. 7 is typically arcuate, with a common radius from the center of the rotor 30, and is sized in circumferential length to bridge the second outlet port 40, illustrated in FIGS. 10 and 11, with either, but not both, the first doser port 44 or the second doser port 46 in the corresponding rotor positions.

In this way the two channels 50,52 and the four ports 36,40,44,46 may be interconnected in alignment or registration in two independent and reversing water circuits to and from the corresponding chambers of the doser 26 for channeling water from the center inlet 36 to the common outlet 40 joined to the icemaker 12.

Since the stator ports 38,48 illustrated in FIG. 6 are radially aligned, both the diversion channel 54 and the linking channel 56 extend radially outwardly from the center of the rotor 30 to cover those two ports when aligned therewith. The linking channel 56 as illustrated in FIG. 8 extends radially in length to join in flow communication the two ports 38,48 in the dispense rotor position, without affecting operation of the valve in other positions of the rotor. As shown in FIGS. 9–11, the linking channel 56 is radially aligned with one of the legs of the switching channel 50 diametrically opposite from the center inlet port 36 and is inoperative in all positions of the rotor other than the dispense position.

The diversion channel 54 illustrated in FIGS. 10 and 11 extends in radial length to cover both ports 38,48 and extends in circumferential width to cover those two ports between both positions A,B of the rotor during operation of the doser 26. The diversion channel 54 typically extends radially outwardly from the center apex of the switching channel 50 at the junction of the two legs thereof diametrically oppositely from the bridging channel 52. In this way, the diversion channel 54 is operable only in the two rotor positions A,B while being inoperable in the other positions of the rotor including dispense and off as illustrated in FIGS. 8 and 9.

In another embodiment illustrated in FIG. 7, the bridging channel 52 is disposed circumferentially between the two legs of the switching channel 50 circumferentially in turn with the diversion channel 54 and the linking channel 56 around the rotor 30 in the counterclockwise direction. In this way, the rotor 30 may be rotated in turn or sequence clockwise in FIGS. 8–11 between the first, second, third, and fourth rotor positions thereof. The rotor off position illustrated in FIG. 9 is a relative center position with the rotor 30 blocking the inlet port 38 and preventing entry of water through the valve.

From the off position of FIG. 9, the rotor 30 may be rotated counterclockwise in FIG. 8 to the dispense rotor position D for providing water to the dispenser 22.

From the off position of FIG. 9, the rotor 30 may be rotated clockwise in turn to the first and second rotor positions A,B of FIGS. 10 and 11 for reversing the water circuits to and from the doser 26 to the icemaker 12. The rotor 30 may be reciprocated repeatedly between the two positions A,B to provide metered doses of water to the icemaker without passing through the off or dispense positions of the rotor.

The dispense position of the rotor is preferably on the opposite side of the off position and ensures uncoupling of the icemaker filling function from the water dispensing function. The center off position of the rotor disconnects all water circuits downstream of the inlet port 38 and prevents leakage in any of those circuits in the event of damage or malfunction therein. In such an event, the corresponding tubes may be removed from the corresponding components for repair or replacement of any of those tubes or components without otherwise interrupting water flow to the valve.

Although the filter 70 has been incorporated in a dedicated circuit with the rotary valve 24, it may be introduced at any other suitable location as desired or may be removed entirely, which can correspondingly simplify the design of the rotary valve and the number of ports and channels required therein.

The rotary valve illustrated in FIG. 2 may be manufactured in a relatively small size for controlling operation of the icemaker and dispenser in one convenient device. The stepper motor 58 is suitably joined into the control circuit of the refrigerator and is operated when desired for precisely rotating the rotor to any one of its various rotor positions for refilling the icemaker or dispensing water.

If desired, the front side of the rotor 30 may include a diametrically extending rib for limiting rotary motion of the rotor upon engaging a cooperating ball loosely trapped in a recess in the bridge 62. This limit position may be used to self-calibrate the stepper motor during each cycle of operation for maintaining accurate registration of the rotor and stator at the several different rotor positions of operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A rotary doser valve comprising:

a stator having a first inlet port, a first outlet port, a first doser port, and a second doser port, said stator comprising a disk having said ports extending axially therethrough; and a rotor having a switching channel and a bridging channel, and disposed in sliding abutment with said stator, said rotor comprising a disk coaxially abutting said stator disk, and having said channels formed as surface grooves therein, said rotor being rotatable against said stator in a first rotor position joining said switching channel in flow communication between said first inlet port and said first doser port, and joining said bridging channel in flow communication between said second doser port and said first outlet port, said rotor being also rotatable to a second rotor position joining said switching channel in flow communication between said first inlet port and said second doser port, and joining said bridging channel in flow communication between said first doser port and said first outlet port, wherein said first inlet port is disposed in a center of said stator disk, and said first and second doser ports are spaced radially outwardly therefrom and circumferentially spaced apart, and wherein said first outlet port is disposed circumferentially between said first and second doser ports.

2. A valve according to claim 1 further comprising a distributor coaxially abutting said stator oppositely to said rotor, and including a plurality of distributor ports disposed in flow communication with respective ones of said stator ports.

3. A valve according to claim 2 wherein said distributor further comprises a plurality of distributor channels extending radially outwardly from respective ones of said distributor ports.

4. A valve according to claim 1 further comprising a motor having a spindle joined to said rotor for selectively rotating said rotor between said first and second rotor positions.

5. A valve according to claim 4 further comprising a spring disposed between said motor and said rotor for pressing said rotor in sealing abutment against said stator.

6. A valve according to claim 5 wherein both said stator and rotor are ceramic with flat abutting surfaces at which said channels and ports thereof are disposed.

7. A valve according to claim 1 further comprising a doser having first and second chambers separated by a movable septum, with said first chamber being disposed in flow communication with said first doser port, and said second chamber being disposed in flow communication with said second doser port.

8. A rotary doser valve comprising:

a stator having a first inlet port, a first outlet port, a first doser port, a second doser port, a second inlet port, and a bypass port; and a rotor having a switching channel, a bridging channel, and a diversion channel, wherein said rotor is disposed in sliding abutment with said stator, wherein said rotor is rotatable against said stator in a first rotor position joining said switching channel in flow communication between said first inlet port and said first doser port and joining said bridging channel in flow communication between said second doser port and said first outlet port, wherein said rotor is also rotatable to a second rotor position joining said switching channel in flow communication between said first inlet port and said second doser port and joining said bridging channel in flow communication between said first doser port and said first outlet port, and wherein said diversion channel is spaced from said switching channel and disposed in flow communication between said second inlet port and said bypass port in both said first and second rotor positions.

9. A valve according to claim 8 further comprising a filter disposed in flow communication between said bypass port and said first inlet port.

10. A valve according to claim 8, wherein:

said stator further includes a second outlet port spaced circumferentially from said doser ports; and said rotor is further rotatable to a third rotor position joining said switching channel in flow communication between said first inlet port and said second outlet port.

11. A valve according to claim 10 wherein said switching channel has two radial legs extending radially outwardly from said first inlet port with an obtuse angle therebetween.

12. A valve according to claim 10 wherein said rotor further includes a linking channel spaced circumferentially between said diversion channel and said switching channel for joining said second inlet port and bypass port in flow communication in said third rotor position.

13. A valve according to claim 12 wherein said second inlet port and bypass port are radially aligned, and said linking channel extends radially.

14. A valve according to claim 13 wherein said diversion channel and said linking channel are spaced circumferentially apart, and are circumferentially offset from said second inlet port and bypass port in a fourth rotor position to block flow therebetween.

* * * * *